May 11, 1954     R. J. GRAY     2,678,006
HAND-OPERATED METERING LIQUID-DISPENSER
Filed Oct. 11, 1949     4 Sheets-Sheet 1
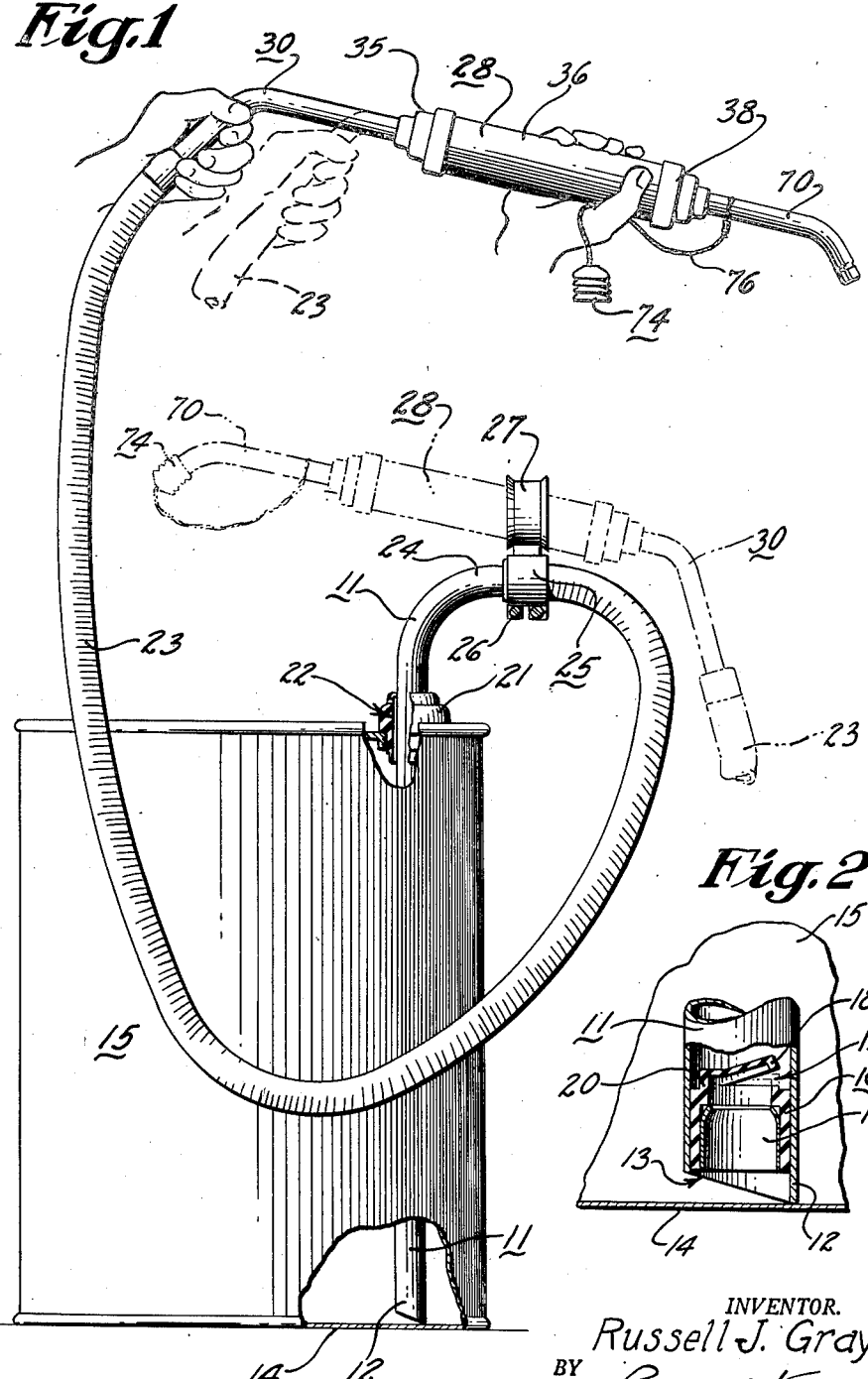
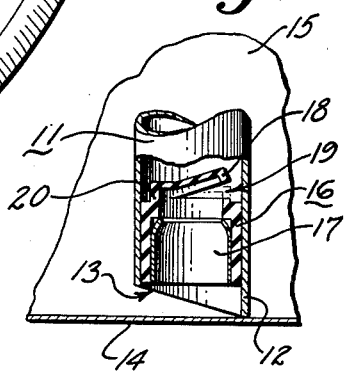
INVENTOR.
Russell J. Gray
BY
Leonard L. Kalish
Attorney May 11, 1954 R. J. GRAY 2,678,006
HAND-OPERATED METERING LIQUID-DISPENSER
Filed Oct. 11, 1949 4 Sheets-Sheet 2
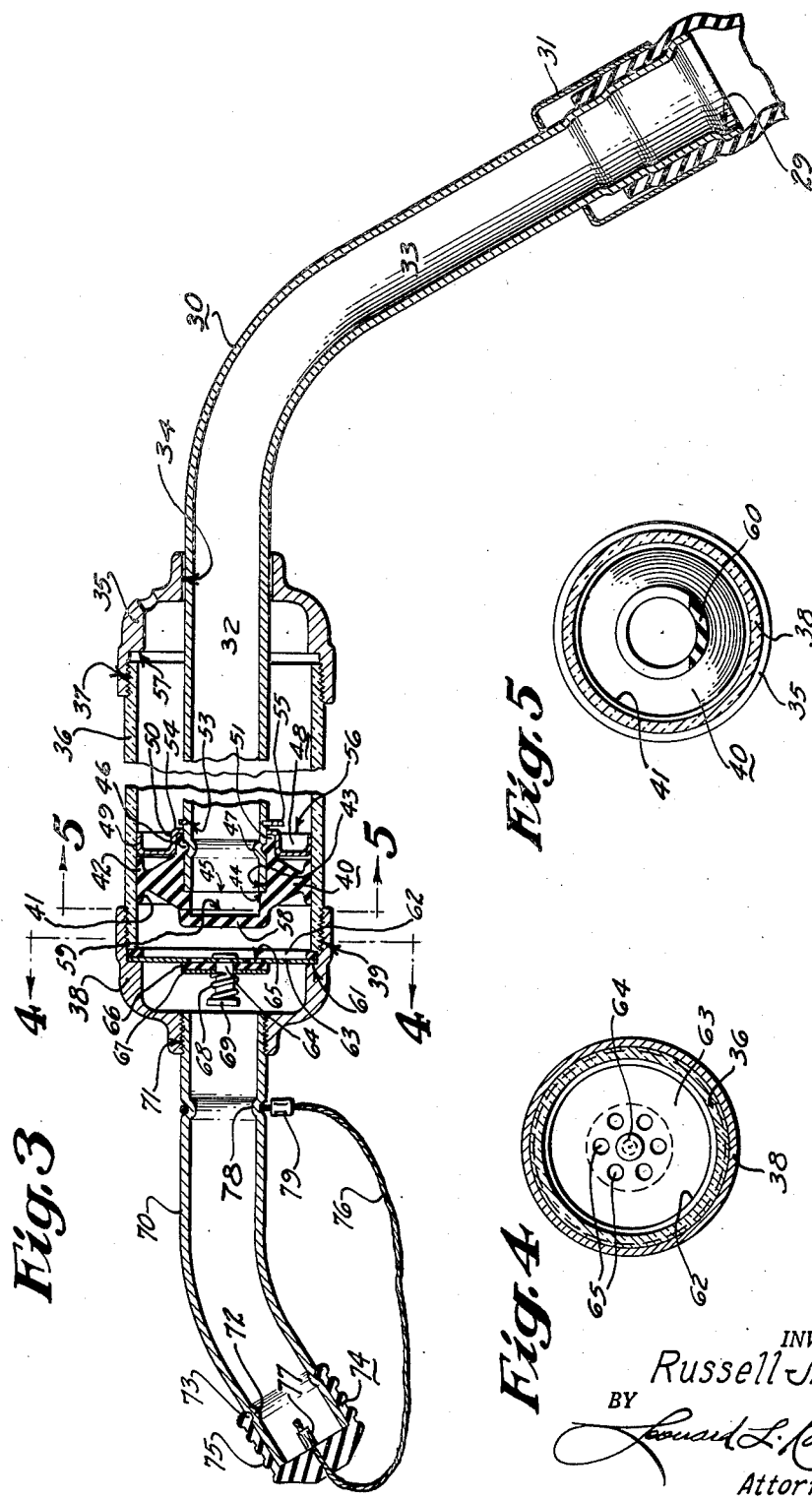
INVENTOR.
Russell J. Gray
BY
Leonard L. Kalish
Attorney May 11, 1954 R. J. GRAY 2,678,006
HAND-OPERATED METERING LIQUID-DISPENSER
Filed Oct. 11, 1949 4 Sheets-Sheet 3
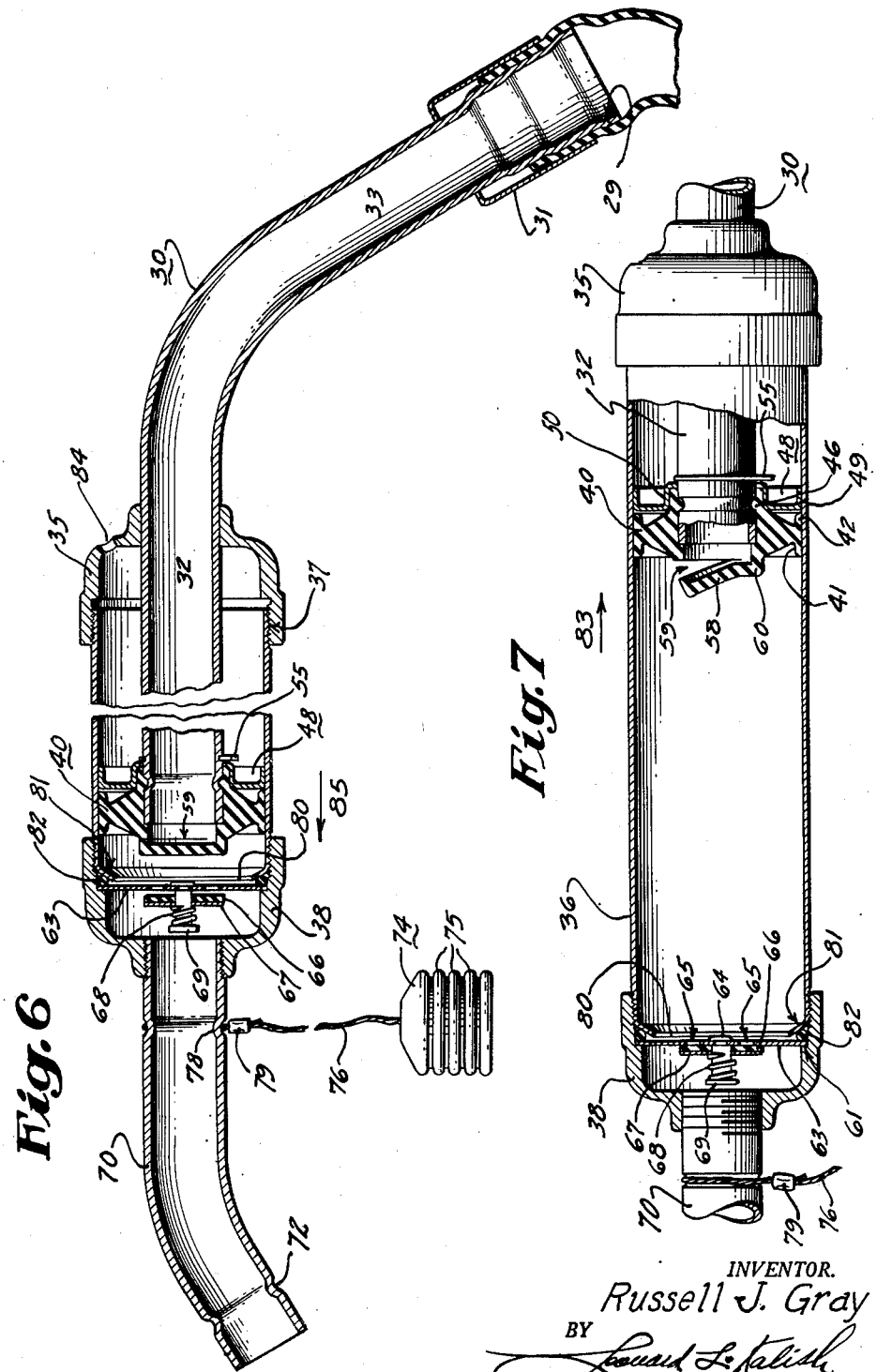
INVENTOR.
Russell J. Gray
BY
Attorney May 11, 1954  R. J. GRAY  2,678,006
HAND-OPERATED METERING LIQUID-DISPENSER
Filed Oct. 11, 1949  4 Sheets-Sheet 4
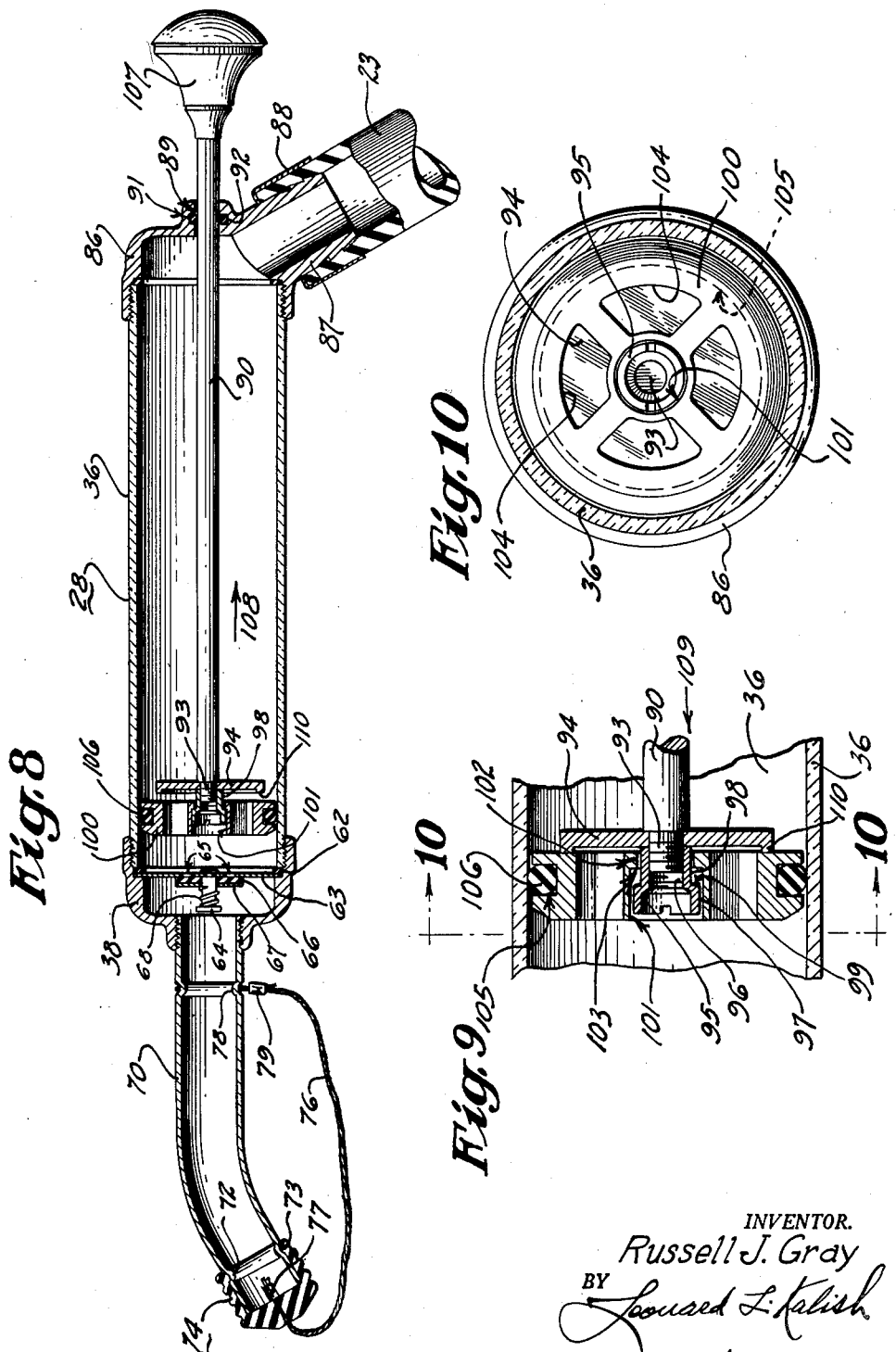
INVENTOR.
Russell J. Gray
BY Leonard L. Kalish
Attorney

UNITED STATES PATENT OFFICE 2,678,006

HAND-OPERATED METERING LIQUID-DISPENSER

Russell J. Gray, Meadeville, Minn.

Application October 11, 1949, Serial No. 120,642

3 Claims. (Cl. 103—178)

The present invention relates to a lubricant dispenser, and particularly to an oil dispenser, for dispensing a measured amount of oil from an original container such as a barrel, drum or the like, into the crank case of an automobile or the like, without the intervention of the usual measuring can or other conventional oil measure.

The object of the present invention is to make it unnecessary to first pour the oil from the original container into a can or the like and then transfer it from the can to the crank case of the automobile.

A further object of the present invention is to provide a simple and inexpensive oil dispenser which can be applied readily to an original drum of oil or the like, and manually operated to draw from the barrel or drum and to deliver to the crank case a measured amount of oil such as pint or a quart (as may be desired) with sufficient accuracy of measure.

With the above and other objects in view which will appear more fully from the following description and accompanying drawings, the oil dispenser of the present invention includes a riser tube adapted to be inserted into the drum and extending to the bottom thereof and having a foot valve therein, a flexible hose of suitable length to reach from the barrel or drum to the crank case of the automobile, as, for instance, a hose of length of approximately eight feet (more or less) and a positive-displacement reciprocating pump on the discharge end of the hose, having a short nozzle, which can be inserted into the fill hole of the crank case, whereby the pump may be manually gripped and operated to withdraw the oil from the drum and to discharge it directly into the crank case.

The present invention further consists of other novel features of construction and arrangement of parts, all of which will appear more fully from the following description and accompanying drawings.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the accompanying drawings, in which like reference characters indicate like parts:

Figure 1 represents a side elevational view of one embodiment of the oil dispenser of the present invention.

Figure 2 represents a fragmentary cross-sectional view of the lower end of the riser tube, in relation to the bottom of the oil drum.

Figure 3 represents a vertical cross-sectional view of one embodiment of the measuring pump forming a part of the oil dispenser of the present invention, shown in its inoperative condition.

Figure 4 represents a section on line 4—4 of Figure 3.

Figure 5 represents a section on line 5—5 of Figure 3.

Figure 6 represents a vertical cross-sectional view of another embodiment of the present invention, similar to that shown in Figure 3, showing the pump in its operative condition during the forward or delivery stroke thereof.

Figure 7 represents a cross-sectional view of the embodiment shown in Figure 6, but showing the pump during its reverse stroke.

Figure 8 represents a vertical cross-sectional view of another embodiment of the measuring pump of the present invention, during the reverse stroke of the piston.

Figure 9 represents a fragmentary cross-sectional view of the piston and piston-valve portion of the pump shown in Figure 8, on an enlarged scale, during the forward or delivery stroke thereof.

Figure 10 represents a section on line 10—10 of Figure 9.

According to the present invention a stand pipe or riser tube 11 is provided, having its lower end 12 preferably cut at an angle, as at 13, so as to prevent the end of the tube from fully contacting the bottom 14 of the oil drum 15, and to permit oil to pass from the bottom of the drum into the riser tube. A foot-valve, or upwardly opening check-valve assembly 16, which may be formed of moulded synthetic rubber or the like, is inserted into the lower end of the riser tube 11 and frictionally held therein by the insertion of a metallic spreader sleeve or ferrule 17, having a slightly in-turned leading upper edge, to permit the free insertion thereof, and being of an outer diameter sufficiently large to squeeze the cylindrical side wall of the valve assembly tightly against the inner diameter of the riser tube. The upper end of the valve assembly is formed with a generally cap-shape valve member 18, of slightly smaller diameter than the inner diameter of the riser tube, which is slitted transversely of the axis of the valve assembly, as at 19; said slit terminating short of a complete severance of the upper cap, so that the connecting portion 20 will serve as a valve support and valve closer, acting in the nature of a spring hinge. The synthetic rubber unit 16 is formed with the upper cap portion 18 in the closed position, so that after a slitting operation, subsequent to the moulding, the cap will tend to stay in its seated position. The position shown in Figure 2 represents that position of the cap during the period in which the oil is being sucked upwardly; namely with the oil raising the cap from its seated position.

The riser tube 11 is supported near its upper end, in a bung hole adapter 21, preferably made of a synthetic rubber composition. The adapter 21 may have a plurality of bung-engaging shoulders, of varying sizes, to accommodate barrelbungs of different diameters. The riser-tube 11 is adapted to pass through the adapter 21, with the adapter 21 inserted in the bung, so as to exclude dirt and rain and other foreign matter from the drum of oil, and yet give support to the riser tube. The barrel 15 may be vented through an aperture or groove 22 extending through the adapter, parallel to the riser-tube 11.

A light-weight, low-pressure and form-retaining flexible hose 23 has one end thereof clamped to the horizontally projecting neck 24 of the riser tube 11, by means of the combination hose clamp and the pump rest 25, the lower portion of which embraces the end of the hose and is fastened around it by means of the tightening screws 26, while the upper end thereof is provided with a loop 27, of a diameter sufficiently large to permit the free insertion of the measuring pump or member 28 when the same is not used, as shown in dotted lines in Figure 1.

The other end of the hose 23 is slipped over the slightly enlarged end 29, of the tubular handle and piston rod member 30, and is securely held thereon by the tubular metallic ferrule or sleeve 31, which when pulled back over the end of the hose, prevents the hose from being pulled off the enlarged end 29 of the combination handle and piston rod 30.

The combined handle and piston rod 30 is formed of two angularly disposed portions 32 and 33, respectively; the part 33 acting as a handle to be gripped manually, in one hand, as indicated in Figure 1, while the portion 32 serves as a hollow tubular piston rod, which enters through and is slidably mounted within the axial hole 34 in the cap member 35 of the measuring member or pump 28.

The metering portion or pump of the oil dispenser of the present invention, particularly in the form or embodiment shown in Figures 1 to 7 inclusive, includes the measuring cylinder 36, preferably formed of a metallic tube, as shown in Figures 1, 6, and 7, or a non-metallic tube such as a "Plexiglass" or nylon or other rigid synthetic tube or other synthetic plastic form-retaining tube, as shown in Figures 3, 4 and 5, which may be transparent, to permit a view of the oil being dispensed. To the rear end of the metering cylinder 36, the rear cap 35 is screw-threadedly secured, as at 37. To the front end of the metering cylinder 36, the cap 38 is similarly secured by screw-threads, as at 39.

A moulded piston 40, formed of synthetic rubber composition, is slidably mounted within the cylindrical metering chamber 36. The piston 40 is provided with opposed cylindrical flanges or lips 41 and 42, which serve to seal and to maintain a sliding seal between the piston and the cylindrical interior surface of the metering chamber 36. The piston 40 is provided with a cylindrical bore 43 of a diameter snugly to receive the outer diameter of the hollow tubular piston rod portion 32, said bore 43 terminating in a slight shoulder 44, which the end 45 of the tubular piston rod may contact when assembled. A slight inwardly extending bead 46 is formed in the bore 43 of the piston member 40, which is adapted to seat in the annular groove 47 which is formed (by rolling or otherwise) into the wall of the tubular piston rod member 32 at a point in registration with said bead 46. A sheet metal piston support and retainer 48, is provided in back of the piston member 40, having a generally cylindrical flange 49, which fits within the cylindrical bore of the metering chamber with more or less clearance, according to whether it is desired to rely upon the flange 49 for further guidance of the piston. The piston support and retainer 48 is also provided with an inner cylindrical portion 50, which telescopes over slight sleeve-like extension 51 of the piston member 40, in which the bead 46 is formed. The cylindrical sleeve-like portion 50 of the piston retainer 48 fits snugly over the sleeve like portion 51 of the piston, so as to prevent the bead 46 from coming out of the annular groove 47 in the tubular piston rod 32; thereby locking the piston 40 on to the piston rod 32 in the manner shown in Figure 3. The second annular groove 53 is also formed in the tubular piston rod 32, immediately adjacent the in-turned lip 54 of the piston retainer 48, and into this groove a snap ring or retainer ring 55 is inserted, to keep the piston retainer 48 from sliding off the sleeve like extension of the piston 40. This insures the retention of the assembled relationship of piston and piston rod, at all times. The snap ring 55 may be removed, by spreading apart the open ends thereof, and the piston and piston rod may be disassembled or reassembled by merely removing the snap ring 55.

The rear edge 56 of the piston support and retainer 48, also serves to abut the shoulder 57 of the rear cap 35 when the piston rod is fully retracted, to act as a stop for the piston and to prevent the rear lip 42 of the piston 40 from becoming damaged by abutment with the shoulder 57.

The front end of the piston 40 is provided with a valve cap 58, formed integrally therewith, similar to the valve cap 18 shown in Figure 2, and similarly slitted, as at 59, with the integral, unslitted end-portion 60 which tends normally to close the valve into the position shown in Figures 3 and 6.

Between the front end of the metering tube 36 and the shoulder 61 of the front cap 38, a sealing gasket 62 and a valve plate 63 are mounted. The valve plate 63 is provided with a central aperture into which the valve supporting pin or stem 64 is riveted or otherwise secured, and is also provided with a plurality of ports 65, of sufficient combined area to permit the adequate passage of oil therethrough.

A valve disc 66 of suitable gasket material, as for instance the same synthetic composition as that of which the piston is formed, is slidably mounted on the valve pin 64, backed by a metallic washer 67, similarly fitted over the pin 64, and a helical compression spring 68 is interposed between the washer 67 and the head 69 of the pin 64, thereby yieldably to urge the valve disc 66 against the valve plate 63 so as to close off the ports 65 thereof, with such force or pressure as may be desired and selected by the proper choice of spring 68.

A short delivery nozzle 70 is threadably mounted in the cap 38, as at 71.

Near the discharge end of the nozzle 70, an annular groove 72 may be provided, for receiving the inwardly extending annular bead 73 of the resilient synthetic rubber cap 74 which is adapted to be slipped over the open end of the nozzle 70, when the oil dispenser is not in use, so as to prevent dripping and also to prevent dirt from getting into the nozzle. The cap 74 may be provided with a plurality of external grooves or ridges 75, to provide a more ready grip, and is preferably loosely held to the nozzle by means of the flexible braided wire 76, one end of which extends through the cap 74 and is anchored therein by a suitable fastener 77, while the other end thereof is looped around the annular groove 78 formed in the nozzle 70, and is tightly secured thereon by means of the fastener 79.

As is shown particularly in Figures 6 and 7, the forward edge 80 of the barrel 36, in an embodiment in which the barrel 36 is a thin-walled metallic-member, may be flanged or in-turned slightly, as at 81, and an O-ring or similar fluid-seal 82 may be interposed between the flange 81 and the valve-plate 63. This method of sealing the joint between the head 38 and the barrel 36 is particularly adapted to thin-walled cylinders which might otherwise cut or damage the gasket 62. However, the sealing-method shown in Figure 3 is equally satisfactory for cylinders 36 which have a thick wall, as for instance, the cylinder of Figure 3.

The operation of the pump 28 of the present invention is as follows: The initial position of the cylinder 36, the piston 40 and the combined handle and piston-rod 30 is as represented in Figure 3, with the piston 40 at its forwardmost position within the barrel 36, and with no oil or fluid as yet disposed within the discharge pipe 70, cylinder 36, combined handle and piston-rod 30, hose 23, or riser-pipe 11. The barrel 36 of the pump 28 is grasped in one hand while the handle 33 is grasped in the other, as is shown in Figure 1, and the handle 33 is pulled outwardly, away from the barrel 36. This pulling action on the handle 33 withdraws the piston 40 in the direction of the arrow 83, as is shown in Figure 7.

The relative movement of the piston 40 and the cylinder 36 creates a vacuum within the barrel 36 and opens the valve 58. The vacuum in the barrel 36 also opens the foot-valve 16 and draws fluid up to the riser-pipe 11. There is no back pressure behind the piston 40 when the handle 33 is withdrawn since the rear end of the barrel 36 is vented through the hole 84 in the rear cap member 35.

When the piston 40 reaches the rear end of the barrel (as for instance when the edge 56 of the support 48 strikes the shoulder 57 of the rear cap member 35) the direction of travel of the piston 40 with respect to the barrel 36 is reversed, as is shown by the arrow 85 in Figure 6. The forward movement of the piston 40 closes the flap 58 and the air drawn into the cylinder 36 ahead of the piston 40 will be compressed and forced out through the apertures 65 in the valve plate 63, raising the gasket 66 from the valve plate 63, against the pressure of the spring 68, as is shown particularly in Figure 6. When the piston 40 reaches the forwardmost end of the barrel 46, the cycle may be reversed and the handle and piston withdrawn (in the direction of the arrow 83) so as to draw still more fluid through the riser-pipe 11, hose 23 and into the combined handle and piston-rod 30. This "priming" action is repeated enough times to draw the oil or fluid into the barrel 36, ahead of the piston 40, so as to fill the barrel 36 when the piston 40 is at the rear end of the barrel. The next subsequent forward movement of the piston 40 will force the oil (entrained within the cylinder 36) past the valve member 66 and out through the discharge pipe 70.

The size of the chamber 36 may be regulated so that its fluid-capacity (with the piston 40 in its rearwardmost position) is equal to a pint, or quart, or any predetermined, desired volume of fluid. On the forward stroke of the piston, an accurately measured and metered quantity of fluid will be discharged through the discharge pipe 70, and each subsequent reciprocation of the handle 33 will deliver a predetermined volume of fluid from the pump 28.

Referring now to Figures 8-10 inclusive, there is shown another embodiment of the pump 28 of the present invention, similar to the embodiment heretofore described, including a rear cap member 86 having an offset extension 87 adapted to receive the hose 23 thereupon and to be securely connected thereto as by the ferrule 88.

An aperture 89 in the rear end of the cap 86 is adapted to receive a piston-rod 90 slidably therein. An annular groove 91 in the cap 86 has a sealing gasket 92 disposed therein whereby to create a fluid-tight sliding seal between the rear cap member 86 and the piston-rod 90. In this manner the fluid may be delivered directly from the hose 23 to the cylinder 36 of the pump 28.

At the forward end of the cylinder 36, a front cap-member 36 with valve plate 63, gasket 62, and valve member 66 disposed therewithin is operatively secured, similar to the cap and valve-plate assembly shown in the embodiment of Figure 3, together with the discharge conduit 70, cap 74 and flexible braided wire 76.

The forward end of the piston-rod 90 has a reduced diameter and is screw-threaded, as at 93. A valve-disc 94 is held at the forward end of the piston-rod 90 (against the shoulder formed between the smaller threaded portion 93 and the outer surface of the rod 90) by a locking nut 95. The locking nut 95 is screw-threaded internally, as at 96, so as to engage the threads 93 on the piston 90, and has a dual-diametered exterior surface including the larger diameter 97 and a smaller diameter 98 with a shoulder 99 interposed therebetween. A piston 100 has a central aperture 101 therein adapted to fit about the larger diameter 97 of the locking nut 95, and a reduced shoulder-portion adapted to fit around the smaller diameter 98 of the locking-nut 95, with a shoulder or abutment 103 interposed between the diameters 101 and 102.

A plurality of openings or ports 104 are disposed in the piston 100. An annular groove 105 in the outer periphery of the piston 100 is adapted to receive a sealing washer 106 so as to create a fluid-tight but sliding seal between the piston 100 and the cylinder 36.

A handle 107 is secured to the outer end of the piston-rod 90 whereby the piston-rod 90 and the piston 100 may be operatively reciprocated within the cylinder 36.

The operation of the piston and pump of the embodiment of Figures 8-10 inclusive is as follows:

With the piston 100 disposed at the forward end of the barrel 36, as is shown in Figure 8, a rearward pull on the handle 107 (in the direction of the arrow 108) will withdraw the piston-rod 90, locking nut 95 and disc 94 a slight distance rearwardly in relation to the piston 100 as is shown particularly in Figure 8. This separates the disc 94 from the piston 100 and exposes the apertures or ports 104 so that any air or fluid entrained within the cylinder 36 between the piston 100 and the rear cap 86 may pass from that end of the cylinder to the forward side of the piston during the withdrawal of the piston-rod 90 and the piston 100 in the direction of the arrow 108. Thus, assuming that the cylinder 36 has been filled with oil or other fluid, as described hereinabove, by suitable priming action, the piston 100 may pass to the rear of the barrel 36, through the filled cylinder, and the fluid will flow from the rear side of the piston 100 to the forward side of the piston 100 through the apertures 104.

When the piston 100 reaches the rear end of the cylinder 36, the direction of movement of the handle 107 and the piston-rod 90 is reversed, as is shown by the arrow 109 in Figure 9. This brings the disc 94 (and particularly the forward raised edge 110 thereof) against the rear side of the piston 100, sealing off the apertures 104. This creates an imperforate, sealed piston which is fluid-tight, and a continued forward motion (in the direction of the arrow 109) will force the fluid entrained within the cylinder 36, ahead of the piston 100, past the disc valve 66 and through the discharge conduit 70. The forward movement of the piston also fills the cylinder 36 with another charge of fluid, drawn into the cylinder 36 behind the piston 100 as the piston 100 moves forward. This double-action (i. e., discharge of fluid from one side of the piston and filling of the cylinder 36 on the other side of the piston), immediately prepares the pump for a second pumping or discharge action. A subsequent rearward and then forward movement of the piston-rod 90 and the piston 100 (in the direction of the arrows 108 and 109) will discharge another metered and measured quantity of fluid from the barrel 36.

The size of the peripheral opening between the edge 110 of the disc 94 and the piston 100 (on the rearward stroke of the piston-rod) may be regulated by forming the shoulder 99 on the locking nut 95 a sufficient distance away from the disc 94 so that the distance between the shoulder 99 and the shoulder 103 (when the disc 94 is in contact with the piston 100) will be equal to the opening desired between the disc 94 and the piston 100 during the rearward movement of the piston.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described my invention I claim as new and desire to protect by Letters Patent the following:

1. A hand-operated metering liquid-dispenser including a generally cylindrical barrel, a piston reciprocably mounted within said barrel in sliding fluid-tight contact with the interior surface of said barrel, a hollow tubular piston-rod operatively secured to said piston and extending from one end of said barrel, said piston being a one-piece flexible resilient molded member having a central bore therein and having a barrel-contacting peripheral flange and an integral flapper-type bore-closing valve member disposed in operative juxtaposition to said bore, a flange integral with said piston and extending axially away therefrom concentrically with said bore on the opposite side thereof from said flapper-type valve, a peripheral bead of smaller inner diameter than the inner diameter of said flange formed integrally with said flange, said piston-rod adapted for operative engagement with the inner surface of said flange and having a peripheral groove at the inner end thereof into which said peripheral bead is adapted to seat interlockingly to engage said piston and said piston-rod, whereby said piston may be reciprocated within said barrel when said piston-rod is reciprocated.

2. A hand-operated metering liquid-dispenser including a generally cylindrical barrel, a piston reciprocably mounted within said barrel in sliding fluid-tight contact with the interior surface of said barrel, a hollow tubular piston-rod operatively secured to said piston and extending from one end of said barrel, asid piston being a one-piece flexible resilient molded member having a central bore therein and having a barrel-contacting peripheral flange and an integral flapper-type bore-closing valve member disposed in operative juxtaposition to said bore, a flange integral with said bore and extending axially away therefrom concentrically with said bore on the opposite side thereof from said flapper-type valve, a peripheral bead of smaller inner diameter than the inner diameter of said flange formed integrally with said flange, said piston-rod adapted for operative engagement with the inner surface of said flange and having a peripheral groove at the inner end thereof into which said peripheral bead is adapted to seat interlockingly to engage said piston and said piston-rod, and a cup-shaped piston-retainer having a central bore therein and having a peripheral flange adapted slidingly to contact the interior surface of said barrel, the bore of said piston-retainer adapted to surround said flange and retain said bead in said groove, whereby said piston may be reciprocated within said barrel when said piston-rod is reciprocated.

3. A hand-operated metering liquid-dispenser including a generally cylindrical barrel, a piston reciprocably mounted within said barrel in sliding fluid-tight contact with the interior surface of said barrel, a hollow tubular piston-rod operatively secured to said piston and extending from one end of said barrel, said piston being a one-piece flexible resilient molded member having a central bore therein and having a barrel-contacting peripheral flange and an integral flapper-type bore-closing valve member disposed in operative juxtaposition to said bore, the inner end of said piston-rod operatively secured to said piston in communication with said bore, whereby said piston may be reciprocated within said barrel when said piston-rod is reciprocated, a hand-grip at the outer end of said hollow piston-rod, a multi-diametered stepped flared portion at the outer end of said piston-rod and a cup-shaped hose-retaining ferrule having a cylindrical inner surface slidably mounted on the outer end of said piston-rod in operative juxtaposition to said multi-diametered end, whereby to secure hoses of varying wall-thickness in a fluid-tight manner to the outer end of said piston-rod.

References Cited in the file of this patent

UNITED STATES PATENTS

| Number | Name | Date |
|---|---|---|
| 128,196 | Zeiher | June 18, 1872 |
| 199,131 | Whitman | Jan. 8, 1878 |
| 246,880 | Hamilton | Sept. 13, 1881 |
| 442,696 | Thompson | Dec. 16, 1890 |
| 523,757 | Brooks | July 31, 1894 |
| 1,476,408 | MacDonald | Dec. 4, 1923 |
| 1,653,562 | Grimley | Dec. 20, 1927 |
| 2,134,622 | Peterson | Oct. 25, 1938 |

FOREIGN PATENTS

| Number | Country | Date |
|---|---|---|
| 2,542 | Great Britain | Jan. 21, 1909 |